United States Patent [19]
Yoshida et al.

[11] Patent Number: 5,447,399
[45] Date of Patent: Sep. 5, 1995

[54] FASTENER FREE FROM A SCISSORING FORCE

[75] Inventors: Makoto Yoshida, Machida; Hiroyuki Matsumoto, Yokohama, both of Japan

[73] Assignee: Aupac Co., Ltd., Tokyo, Japan

[21] Appl. No.: 944,118

[22] Filed: Sep. 10, 1992

[30] Foreign Application Priority Data

Sep. 10, 1991 [JP] Japan .................. 3-080781 U

[51] Int. Cl.⁶ ...................... F16B 21/00; F16B 35/02
[52] U.S. Cl. ...................... 411/383; 411/339; 411/903; 411/914
[58] Field of Search ............... 411/338, 339, 383, 369, 411/370, 546, 901–903, 907, 914

[56] References Cited

U.S. PATENT DOCUMENTS

| | | | |
|---|---|---|---|
| 2,393,564 | 1/1946 | Poupitch | 411/914 X |
| 3,042,961 | 7/1962 | Tieri | 411/903 X |
| 3,271,058 | 9/1966 | Anderson | 411/383 X |
| 3,620,119 | 11/1971 | King, Jr. et al. | 411/902 X |
| 3,687,496 | 8/1972 | Hindin | 411/339 |
| 4,048,898 | 9/1977 | Salter | 411/339 X |
| 4,244,661 | 1/1981 | Dervy | 403/243 |
| 4,447,055 | 5/1984 | Ahrens | 411/903 X |
| 4,681,497 | 7/1987 | Berecz | 411/383 |
| 4,850,771 | 7/1989 | Hurd | 411/339 X |
| 4,869,632 | 9/1989 | Radtke | 411/383 X |

Primary Examiner—Neill R. Wilson
Attorney, Agent, or Firm—Birch, Stewart, Kolasch & Birch

[57] ABSTRACT

A bolt, rivet or similar fastener for fastening separate structural parts has a shank, and a tubular cover member covering at least part of the periphery of the shank for preventing a stress from concentrating in part of the shank. The cover member is made of a material having greater deformability or greater elastic strain energy than the material constituting the shank or is made of a material having a relatively small coefficient of friction. When vibration or impact acts on the fastener, the cover member disperses the resulting stress to protect the shank against breakage.

49 Claims, 4 Drawing Sheets

FASTENER FREE FROM A SCISSORING FORCE

BACKGROUND OF THE INVENTION

1. Field of the Invention

The present invention relates to a bolt, rivet or similar fastener for fastening various kinds of work, e.g., aggregates and panels constituting a machine or a structure as well as machine parts. More particularly, the present invention is concerned with a fastener which allows a minimum of stress concentration to occur therein when subjected to a shearing force ascribable to an axial force or a bending force acting on the work.

2. Description of Background Art

Fasteners including bolts and rivets are a traditional implement for connecting aggregates, panels, machine parts and so forth. The problem with a conventional fastener of this kind is that when subjected to an impact force due to the vibration of a machine, the passage of an automobile, an earthquake or similar occurrence, the fastener cannot receive the force evenly and, therefore, causes a shearing force to act thereon. The shearing force often invites stress concentration great enough to break the fastener. This is ascribable to, for example, the irregular pitch of a bolt, the inaccurate verticality of a hole for receiving the bolt, and the diameter of the hole which is greater than that of the bolt.

SUMMARY OF THE INVENTION

It is therefore an object of the present invention to provide a bolt, rivet or similar fastener which allows a minimum of stress concentration to occur therein when subjected to an external force.

A fastener for fastening structural parts of the present invention has a shank, and a cover member covering at least a part of the length of the shank for preventing a stress from concentrating in part of the shank. The cover member is made of a material having greater deformability than the material constituting the shank, i.e., lead or similar material which is low in yield stress and viscous. Alternatively, the cover member may be made of a material having greater elastic strain energy than the material of the shank, e.g., a superelastic material having a low elastic coefficient and a broad range of elasticity. If desired use may be made of a material having a relatively small coefficient of friction. When vibrations or impact acts on the fastener, the cover member disperses the resulting stress to protect the shank against breakage.

BRIEF DESCRIPTION OF THE DRAWINGS

The above and other features of the present invention will become more apparent from the consideration of the following detailed description taken in conjunction with the accompanying drawings in which.

DESCRIPTION OF THE PREFERRED EMBODIMENTS

Figure 5:
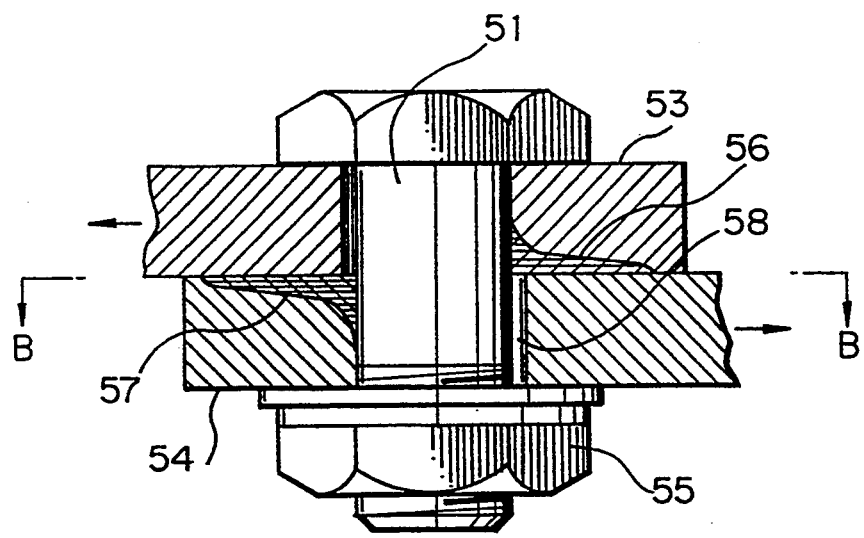
FIG. 5 is a sectional side elevation of a conventional bolt in a condition free from a shearing force.
Figure 6:
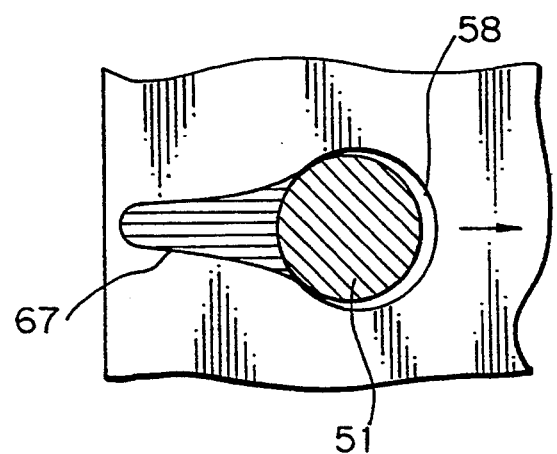
FIG. 6 is is a section along line B—B of FIG. 5, showing the conventional bolt acted on by a shearing force.

To better understand the present invention, a brief reference will be made to a conventional fastener in the form of a bolt, shown in FIGS. 5 and 6. In FIG. 5, the conventional bolt 51 is shown as fastening two panels 53 and 54 by way of example. When the panels 53 and 54 are each subjected to a tension in a direction indicated by an arrow in the figure, a shearing force acts on the bolt 51. As a result, the surface pressure is distributed in the axial direction of the bolt 51, as indicated by double hatched portions 56 and 57 in FIG. 5. Specifically, a stress concentrates in a portion of the bolt 51 where the plates 53 and 54 contact each other. FIG. 6 shows a surface pressure distribution 67 in the plane where the two panels 53 and 54 contact each other, i.e., in the circumferential direction of the bolt 51. In the plane shown in FIG. 6, the stress concentrates to break the bolt 51. One of the causes of the stress concentration is a bolt hole 58, FIG. 6, which is usually slightly greater in diameter than the bolt 51. Such an occurrence is also true with a rivet which may be used to connect the panels 53 and 54. Even when no tensions act on the panels 53 and 54, the shank of a bolt or that of a rivet is subjected to a shearing force when a bending moment is distributed. Another cause of the stress concentration is the friction acting between the periphery of the shank of the bolt and the walls of holes formed in the members to be fastened.

Figure 1A:
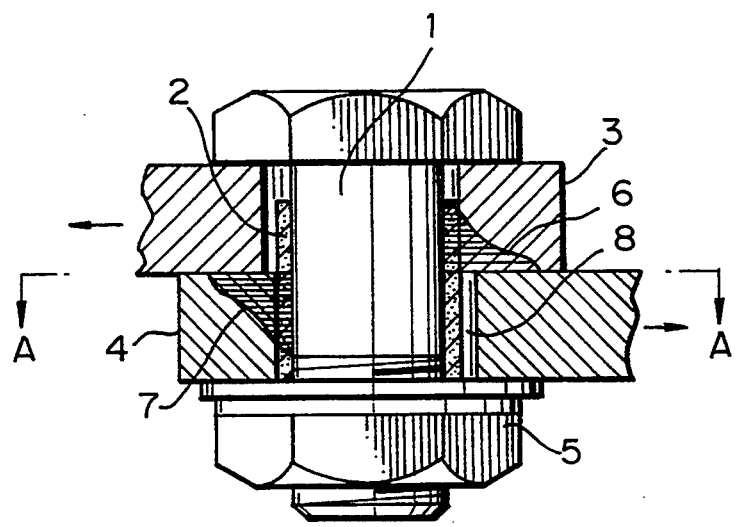
FIG. 1A is a sectional side elevation of a fastener embodying the present invention and implemented as a bolt.
Figure 1B:
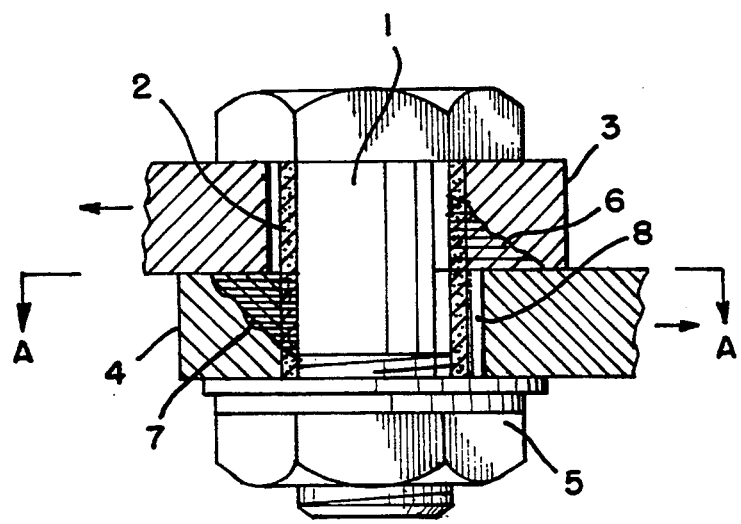
FIG. 1B is a sectional side elevation of a fastener embodying the present invention and implemented as a bolt.

Referring to FIGS. 1A and 1B of the drawings, a fastener embodying the present invention is shown and implemented as a bolt by way of example. As shown, the bolt has a shank 1 and a cover member 2 covering the whole or part of the length of the shank 1. The cover member 2 is constituted by a material having a greater energy absorption value than the material constituting the shank 1. The cover member 2 should preferably be formed of a superelastic material, copper, copper alloy, lead or lead alloy which does not easily rust of break and hardlys suffers from hydrogen embrittlement and delayed breakage. Particularly, a superelastic substance counteracts working repetitive external forces more effectively than the others since the cover member 2 will regain the original shape thereof when an external force (shearing force acting on the shank 1) is removed. The superelastic substance may be implemented as nickel-titanium (NiTi) alloy, for example.

Electromechanical interactions between the cover member 2 and the bolt and work, or members, to be fastened by the bolt is another factor that should be taken into consideration in selecting the material of the cover member 2. For example, assuming that both the bolt and the workpeice to be fastened are made of iron, it is desirable to select aluminum, zinc or similar material which tends to ionize more than iron and, therefore, prevents the bolt and workpeice from easily rusting while suppressing delayed breakage due to microcracks. Further, when the cover member 2 is made of tetraethylenefluoride or similar synthetic resin having an inherently small coefficient of friction, it reduces the friction between the surface of the bolt and the walls of the holes formed through the members to be fastened. This is successful in reducing stress concentration ascribable to friction.

The cover member 2 is implemented by a tube or a flat sheet or undulated sheet rolled in a tubular configuration. The thickness of the cover member or tube 2 is open to choice and may be determined in matching relation to a desired application. Generally, assuming that the shank 1 of the bolt has a diameter of $d_1$, the thickness should desirably be 0.05 to 0.1 times the diameter, $d_1$ i.e., $0.05 - 0.1 \times d_1$.

Figure 3:
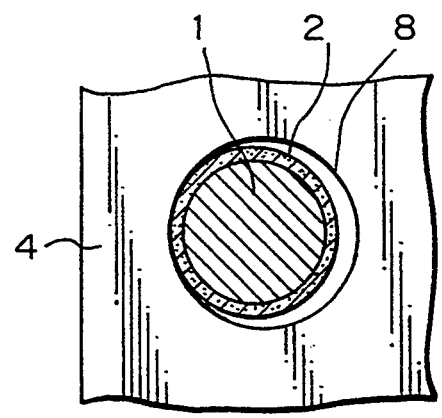
FIG. 3 is a section along line A—A of FIG. 1A showing the bolt in a condition free from a shearing force.

The cover member 2 may closely contact the surface of the shank 1 or slightly loosely coupled over the latter, as desired. Let the inside diameter of the covering layer 2 be $d_2$. For close contact, the inside diameter $d_2$ of the cover member 2 is selected to be equal to or slightly smaller than the diameter $d_1$ of the shank 1, and the member 2 is press fitted, adhered or otherwise affixed to the shank 1. For loose coupling, i.e., when the inside diameter $d_2$ of the cover member 2 is greater than the diameter $d_1$ of the shank 1, it is preferable to temporarily connect the member 2 to the shaft 1 by, for example, spot welding or adhesive in order to facilitate the fastening operation to be effected afterwards. Alternatively, the cover member 2 may be coupled over the shank 1 immediately before the fastening operation. In any case, the cover member 2 is coupled over the shank 1 and passed through holes 8 formed in members 3 and 4 to be fastened, and then a nut 5 is threaded over the end of the shank 1 to thereby fasten the members 3 and 4. FIG. 3 shows the shank 1 and cover member 2 in the fastening condition in a section along line A—A of FIG. 1.

Referring again to FIG. 1, when an external force is exerted on the members 3 and 4 fastened by the bolt, a shearing force acts on the shank 1 of the bolt due to a static load or an impact load directed as indicated by an arrow in the figure. As a result, the condition changes from one shown in FIG. 3 to one shown in FIG. 4. Specifically, FIG. 4 suggests that the cover member 2 has greater deformability or greater elastic strain energy than the shank 1 and is deformed to disperse the stress. A pressure distribution 47 shown in FIG. 4 clearly indicates that the concentration of stress is noticeably reduced, compared to the pressure distribution 67 of FIG. 6 particular to the conventional bolt lacking the cover member 2. In addition, the surface pressure in the axial direction of the bolt is more dispersed than in the case of the conventional bolt (see the portions 56 and 57, FIG. 5).

Figure 2:
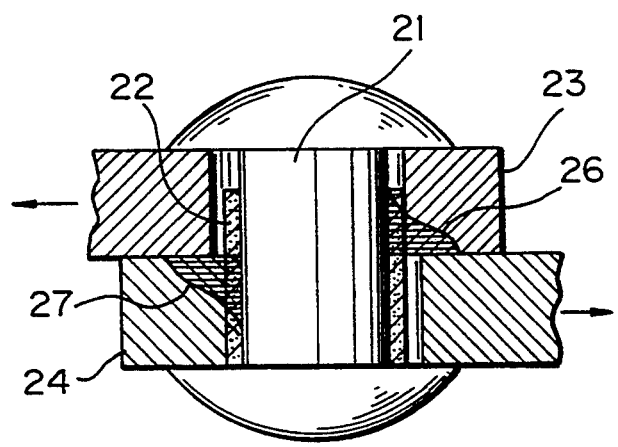
FIG. 2 is a sectional side elevation of an alternative embodiment of the present invention which is implemented as a rivet.
Figure 4:
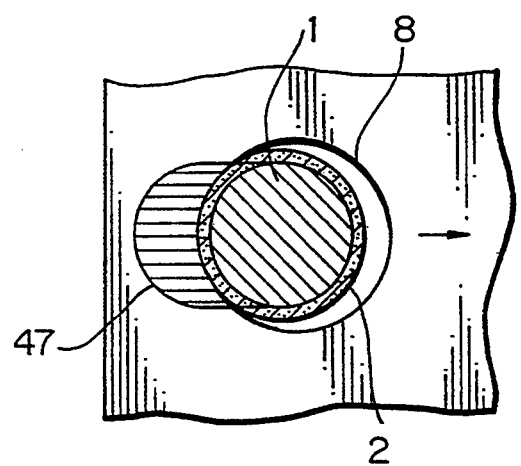
FIG. 4 is a view similar to FIG. 3, showing the bolt in a condition acted on by a shearing force.

FIG. 2 shows an alternative embodiment of the present invention which is implemented as a rivet. As shown, the rivet has a shank 21 and a cover member 22 which are identical with the shank and cover member 2 of the bolt described above with respect to the configuration. When members 23 and 24 fastened by the rivet are each subjected to a force as indicated by an arrow in the figure, a surface pressure acts in-the axial direction of the shank 21 in a distribution represented by double hatched portions 26 and 27. It will be seen that the cover member 22 covering the shank 21 disperses the surface pressure acting on the shank 21, thereby reducing local stress concentration. The surface pressure distribution on the circumference of the shank described with reference to FIG. 4 is also true with the rivet.

In summary, it will be seen that the present invention provides a fastener which suffers from a minimum of local stress concentration when a static external force or vibrations or similar impact force acts by dispersing the resulting stress acting on the shank thereof. The fastener, therefore, does not easily crack or break despite the stress and is desirably applicable to aggregates, panels, and machine parts. A cover member for covering the shank may be temporarily affixed to the shank in order to protect the surface of the shank from scratches which is one of the causes of stress concentration. Another advantage achievable with the invention is that when structural members are fastened together by a plurality of such fasteners, the stress dispersion renders the load distribution ascribable to an external force uniform despite some pitch error of bolt holes, guaranteeing the designed mechanical strength of the structural members. In addition, when the cover member is made of tetraethylenefluoride or similar substance having a small coefficient of friction, the friction between the shank of the fastener and the walls of holes of work and, therefore, the stress concentration due to the friction is reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A fastener for fastening members having bores formed therein, said fastener comprising:
    a shank having a length of a cylindrical portion with an outer circumference sized to fit into the bores formed in the members; and
    a cover member having a length of tube substantially equal to the length of the cylindrical portion of said shank and a diameter not exceeding a diameter of the bores, said cover member being closed in a circumferential direction of the cylindrical portion and covering the outer circumference of said shank except a portion including and adjacent one end of the cylindrical portion of said shank, said cover member being made of a material dispersing a scissoring force concentrated on said shank due to dislocation of the members fastened when an external force acts on the members fastened by said fastener.

2. The fastener according to claim 1, wherein said cover member is constructed of a material having a greater deformability relative to the material of said shank.

3. The fastener according to claim 2, wherein said cover member is constructed of a synthetic resin having a low coefficient of friction.

4. The fastener according to claim 3, wherein said cover member is constructed of tetraethylenefluoride.

5. The fastener according to claim 1, wherein said cover member is constructed of a material having a greater elastic strain energy relative to said shank.

6. The fastener according to claim 5, wherein said cover member is constructed of synthetic resin having a low coefficient of friction.

7. The fastener according to claim 6, wherein said cover member is constructed of tetraethylenefluoride.

8. The fastener according to claim 1, wherein said cover member is a tubular member externally inserted over said shank, and of an inner diameter substantially equal to or slightly smaller than a diameter of the cylindrical portion of said shank.

9. The fastener according to claim 1, wherein said fastener is a bolt and a nut.

10. The fastener according to claim 1, wherein said fastener is a rivet.

11. The fastener according to claim 1, wherein a thickness of said cover member is from 0.05 to 0.1 times a diameter of said shank.

12. The fastener according to claim 1, wherein said cover member is fixed to said shank.

13. The fastener according to claim 1, wherein said cover member is a tubular member externally inserted over said shank, and of an inner diameter larger than a diameter of the cylindrical portion of said shank.

14. A fastener comprising:
a shank having a predetermined length and an outer circumference;
a cover member constructed of tetraethylenefluoride having a predetermined length less than the predetermined length of said shank for covering a portion of the outer circumference of said shank for dispersing a scissoring force concentrated on said shank due to dislocation of fastened members when an external force acts on the members fastened by said fastener.

15. The fastener according to claim 14, wherein said cover member is constructed of a material having a greater deformability relative to the material of said shank.

16. The fastener according to claim 15, wherein said cover member is constructed of a synthetic resin having a low coefficient of friction.

17. The fastener according to claim 14, wherein said cover member is constructed of a material having a greater elastic strain energy relative to said shank.

18. The fastener according to claim 17, wherein said cover member is constructed of synthetic resin having a low coefficient of friction.

19. The fastener according to claim 14, wherein said cover member is a tubular member externally inserted over said shank.

20. The fastener according to claim 14, wherein said fastener is a bolt and a nut.

21. The fastener according to claim 14, wherein said fastener is a rivet.

22. The fastener according to claim 14, wherein a thickness of said cover member is from 0.05 to 0.1 times a diameter of said shank.

23. The fastener according to claim 14, wherein said cover member is fixed to said shank.

24. The fastener according to claim 14, wherein said cover member is a tubular member externally inserted over said shank, and of an inner diameter larger than a diameter of the cylindrical portion of said shank.

25. The fastener according to claim 19, wherein said tubular member is of an inner diameter substantially equal to or slightly smaller than a diameter of said shank.

26. The fastener according to claim 19, wherein said tubular member is of an inner diameter larger than a diameter of the cylindrical portion of said shank.

27. A fastener for fastening members having bores formed therein, said fastener comprising:
a shank having a length of a cylindrical portion with an outer circumference sized to fit into the bores formed in the members; and
a cover member having a length of tube equal to the length of the cylindrical portion of said shank and a diameter not exceeding a diameter of the bores, said cover member being closed in a circumferential direction of the cylindrical portion and covering the outer circumference of said shank, said cover member being made of a material dispersing a scissoring force concentrated on said shank due to dislocation of the members fastened when an external force acts on the members fastened by said fastener.

28. The fastener according to claim 27, wherein said cover member is constructed of a material having a greater deformability relative to the material of said shank.

29. The fastener according to claim 28, wherein said cover member is constructed of a synthetic resin having a low coefficient of friction.

30. The fastener according to claim 29, wherein said cover member is constructed of tetraethylenefluoride.

31. The fastener according to claim 27, wherein said cover member is constructed of a material having a greater elastic strain energy relative to said shank.

32. The fastener according to claim 31, wherein said cover member is constructed of synthetic resin having a low coefficient of friction.

33. The fastener according to claim 32, wherein said cover member is constructed of tetraethylenefluoride.

34. The fastener according to claim 27, wherein said cover member is a tubular member externally inserted over said shank, and of an inner diameter substantially equal to or slightly smaller than a diameter of the cylindrical portion of said shank.

35. The fastener according to claim 27, wherein said fastener is a bolt and a nut.

36. The fastener according to claim 27, wherein said fastener is a rivet.

37. The fastener according to claim 27, wherein a thickness of said cover member is from 0.05 to 0.1 times a diameter of said shank.

38. The fastener according to claim 27, wherein said cover member is fixed to said shank.

39. The fastener according to claim 27, wherein said cover member is a tubular member externally inserted over said shank, and of an inner diameter larger than a diameter of the cylindrical portion of said shank.

40. A rivet fastener for fastening members having bores formed therein, said fastener comprising:
a shank having a length of a cylindrical portion with an outer circumference sized to fit into the bores formed in the members; and
a cover member having a length of tube substantially equal to the length of the cylindrical portion of said shank and a diameter not exceeding a diameter of the bores, said cover member being closed in a circumferential direction of the cylindrical portion and covering the outer circumference of said shank except a portion including and near one end of the cylindrical portion of said shank, said cover member being made of a material dispersing a scissoring force concentrated on said shank due to dislocation of the members fastened when an external force acts on the members fastened by said fastener, wherein said cover member is constructed of a material having a greater deformability relative to the material of said shank.

41. The rivet fastener according to claim 40, wherein said cover member is constructed of a synthetic resin having a low coefficient of friction.

42. The rivet fastener according to claim 41, wherein said cover member is constructed of tetraethylenefluoride.

43. The rivet fastener according to claim 40, wherein said cover member is constructed of a material having a greater elastic strain energy relative to said shank.

44. The rivet fastener according to claim 43, wherein said cover member is constructed of synthetic resin having a low coefficient of friction.

45. The rivet fastener according to claim 44, wherein said cover member is constructed of tetraethylenefluoride.

46. The rivet fastener according to claim 40, wherein said cover member is a tubular member externally inserted over said shank, and of an inner diameter substantially equal to or slightly smaller than a diameter of the cylindrical portion of said shank.

47. The rivet fastener according to claim 40, wherein a thickness of said cover member is from 0.05 to 0.1 times a diameter of said shank.

48. The rivet fastener according to claim 40, wherein said cover member is fixed to said shank.

49. The rivet fastener according to claim 40, wherein said cover member is a tubular member externally inserted over said shank, and of an inner diameter larger than a diameter of the cylindrical portion of said shank.

* * * * *